United States Patent [19]

Blondel et al.

[11] Patent Number: 5,309,230
[45] Date of Patent: May 3, 1994

[54] HIGH-SENSITIVITY INFRARED DETECTOR AND AN INFRARED CAMERA USING SUCH A DETECTOR

[75] Inventors: Philippe Blondel, Choisy le Roi; Francis Bertrand, Acheres, both of France

[73] Assignee: Thomson-CSF, Puteaux, France

[21] Appl. No.: 950,997

[22] Filed: Sep. 25, 1992

[30] Foreign Application Priority Data

Oct. 8, 1991 [FR] France ................ 91 12351

[51] Int. Cl.[5] ............................................. H04N 7/18
[52] U.S. Cl. .................................... 348/164; 348/169; 348/170
[58] Field of Search ............ 358/113, 125, 126, 213.25, 358/213.29; 250/332, 334, 370.08, 203 R; H04N 7/18

[56] References Cited

U.S. PATENT DOCUMENTS

| | | | |
|---|---|---|---|
| 4,054,797 | 10/1977 | Miton et al. | 250/332 |
| 4,092,670 | 5/1978 | Wittke | 358/125 |
| 4,314,275 | 2/1982 | Chapman | 358/113 |
| 4,399,464 | 8/1983 | Hix et al. | 358/213 |
| 4,430,673 | 2/1984 | Salomon et al. | 358/125 |
| 4,603,354 | 7/1986 | Hashimoto et al. | 358/213.25 |
| 4,672,439 | 6/1987 | Florence et al. | 358/113 |
| 4,740,681 | 4/1988 | Tsuno | 250/203 R |
| 4,870,293 | 9/1989 | Elabd | 358/213.25 |
| 4,937,774 | 6/1990 | Malinowski | 464/724.12 |
| 4,952,809 | 8/1990 | McEwen | 358/113 |
| 5,005,085 | 4/1991 | Spies et al. | 358/125 |
| 5,040,070 | 8/1991 | Higashitsutsumi et al. | 358/213.25 |
| 5,118,943 | 6/1992 | Le Bars et al. | 358/113 |

FOREIGN PATENT DOCUMENTS 2185166 7/1987 United Kingdom.

Primary Examiner—Howard W. Britton
Assistant Examiner—Richard Lee
Attorney, Agent, or Firm—Pollock, VandeSande & Priddy

[57] ABSTRACT

A high-sensity infrared detector system includes circuitry for summing the luminance values of flux received by the photosensitive cells in a detection matrix, these values being read in succession by a CCD read circuit at a frame rate and then converted to select adding operations applied to match the characteristics of a detector scan. An accumulator consists of an integrator having a multiplier connected to a memory containing sets of coefficients, each coefficient having two possible values and each value indicating a type of addition—with or without a cell shift. Secondly, an accumulator is provided to sum the luminance values following a defined scheme. A scanning system outputs data concerning the scan characteristics to detector selection circuits to select a set of coefficients from memory.

6 Claims, 3 Drawing Sheets

HIGH-SENSITIVITY INFRARED DETECTOR AND AN INFRARED CAMERA USING SUCH A DETECTOR

RELATED COPENDING APPLICATION

The following copending application is related to the present invention: U.S. Ser. No. 07/881,295, filed May 11, 1992.

BACKGROUND OF THE INVENTION

1. Field of the Invention

This invention applies to target acquisition involving location of a target followed by target tracking using infrared imagery; more specifically, the invention is a high-sensitivity infrared detector and an infrared camera using such a detector to fulfil, in particular, target acquisition functions.

Conventionally, infrared cameras include a detector in the form of a strip or mosaic of photosensitive cells arranged, respectively, either in a row of a small number of cells or in a matrix of rows and columns. This detector is placed on the cold face of a cryostat and analyzes an image of the scene received through a lens. An opto-mechanical system scans this image on the detector to generate a signal proportional to the luminous flux received from the scene observed. Examples are the 288×4-pixel strip and the 32×32-pixel matrix developed by SOFRADIR. These cameras produce a video signal by converting, between two read operations, the charges accumulated in storage sinks which are directly proportional to the flux received by each pixel. The conversion is done by devices known as CCDs (Charge-Coupled Devices). These devices are controlled by an addressing circuit and allow selective access to the storage sinks; they multiplex the charges stored to form the video signal.

Matrix detectors with a considerably higher number of cells have been developed recently. These detectors analyze the image directly without needing a scan system and then form veritable electronic-scan retinas. For example, LIR have developed a 128×128-pixel electronic retina.

Generally, infrared cameras are used in homing heads capable of searching for a target and then tracking it, depending on the mission phase.

In the search mode, the camera must scan all or part of the accessible surrounding space. The camera must, therefore, be used with an opto-mechanical scanning system located at input to the homing head, for example a panoramic mirror with a variable line of sight. The scene contents can then vary quickly in time.

In the tracking mode, once the camera has identified or "locked onto" the target, the line of sight varies little since the image processing resources allow it to be slaved to the target direction. The contents of the scene seen then vary little during this second phase.

Regardless of the mode in which the camera is used, high sensitivity is required to correctly analyze the signal output. In fact, the continuous component of the signal, representing the scene background, forms a very large part of the signal compared to the variable component which represents the useful information. For example, in conventional 3–5 μm and 8–12 μm infrared spectrum windows, a difference of 1° in temperature between the scene and the background only changes the video signal 1% compared to the continuous component.

2. Description of the Related Art

In general terms, to improve the sensitivity, it is essential to increase the signal level detected for each unit surface area in the image of the scene observed, generally referred to as the picture element or pixel.

One solution is to increase the period over which the charges in the storage sinks are accumulated but saturation of the sinks considerably limits the efficiency of this method.

Another solution is to increase the number of photosensitive cells for each pixel: it is known that the sensitivity of a detector is proportional to the square root of the number of photosensitive cells used to form a given pixel. However, the image resolution decreases quickly.

These two general methods therefore offer very limited possibilities of improving the sensitivity.

A specific technique has therefore been developed, for each mode of infrared camera use, to further increase the sensitivity of the detectors; this improvement is obtained by following each pixel in time and accumulating the successive charges received for the same pixel.

In the search mode, the image changes quickly in time and the most suitable method of improving sensitivity uses the TDI technique (Time-Delay Integration). TDI involves adding the charges stored, in succession, by the various individual photosensitive cells which receive, at different times, the light flux corresponding to a given point in the scene observed. The processing may be applied at the detector itself (when it is known as internal TDI) or outside the detector (external TDI), using a digital operator and a memory dedicated to this function. TDI can only be applied to scanning detectors whose photosensitive cells "see" the same point in the scene as successive instants and is not, therefore, suitable for static electronic retinas or matrix detectors.

In the tracking mode, sensitivity is improved by a technique known as post-integration. This technique is based on the fact that, because the scene observed varies very little in time, a given individual cell sees the same pixel at different instants. Post-integration then involves summing, pixel by pixel, n successive charges corresponding to n successive images. For a given pixel, the equivalent time over which the charges stored are accumulated is thus increased without saturating the storage sinks. To implement this function requires the use, after digitization, of an image memory and a dedicated operator. Post integration is only applicable to detector retinas or, possibly, detectors used statically, i.e. with no scan.

Consequently, it is only possible to improve the sensitivity of the detectors described above in one homing head operating mode to the exclusion of the other, i.e. by using scanning detectors in the target location mode and static detectors in the target tracking mode.

The problem is to obtain a signal whose sensitivity remains high for both these main phases in a conventional target acquisition function, i.e. during both the search phase and then, after locking onto an identified target, in the target tracking phase.

SUMMARY OF THE INVENTION

To resolve this problem, the invention uses a combination of the prior TDI and post-integration techniques applied to scanning infrared detection, the detector itself being either a strip or a mosaic.

More precisely, the high-sensitivity infrared detector complying with the invention comprises a matrix of individual photosensitive cells, circuits to form a video signal based on multiplexing, at input from a CCD read circuit, the luminance signals output successively by the cells, these signals being proportional to the luminous flux originating from each of the pixels in an image of the scene observed and received by each of the corresponding detector cells during a periodic scan of the scene image by the detector, the scan being controlled by a scanning system, and circuits to convert the video signal into digital luminance values corresponding to the signals output by the photosensitive cells, the detector including:

circuits to sum the luminance values generated, during reads of successive frames, in order to accumulate the luminance value output by each of the detector cells when reading a frame either by adding it to the luminance value output by the same cell, with no shift, or to that output, after shift, by an adjacent cell partially covering the same pixel when reading the next frame;

and circuits to select, in time and based on data concerning the detector scan characteristics, the type of successive additions required, either with or without a cell shift, and the number of additions in the form of sequences.

The invention, which can be adapted to any detector scan mode linear, circular or spiral—is also an infrared camera employing such a detector to generate a high-sensitivity signal, particularly throughout a complete target acquisition mission.

BRIEF DESCRIPTION OF THE DRAWINGS

The invention will be better understood and other advantages will become clear on reading the following description, referring to the appended figures of which.

DESCRIPTION OF THE PREFERRED EMBODIMENT

Figure 1:
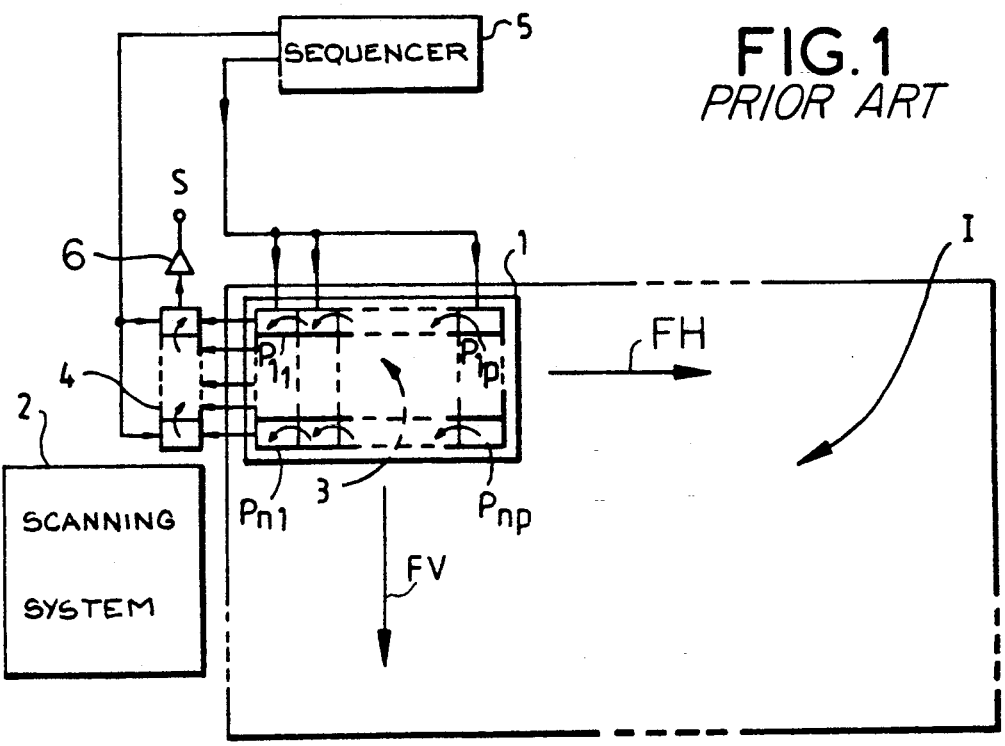
FIGS. 1 and 2 are respectively illustrations of embodiments of internal time delay integration (TDI) and external TDI complying with the prior art.
Figure 2:
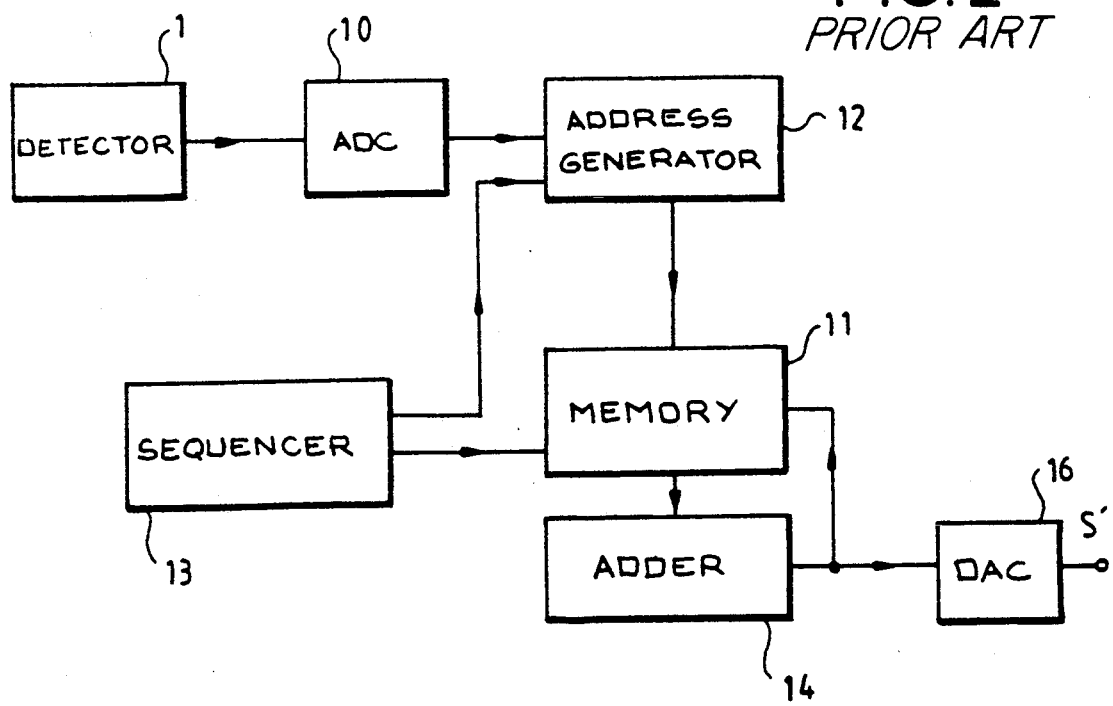

FIG. 1 illustrates an example of an internal TDI circuit complying with the prior art.

A detector 1 scans an image I of the scene observed, controlled by an opto-mechanical scan system 2. Conventionally, a series-parallel scan is used consisting of a high-speed horizontal scan, in the direction of arrow FH, and a low-speed vertical scan, in the direction of arrow FV. The scans are controlled by voltages with a sawtooth waveform.

Conventionally, infrared detector 1 comprises individual photosensitive cells, designated Pij, arranged in n rows and p columns, i and j varying from 1 to n and 1 to p respectively. The figure shows cells P11, P1p, Pn1 and Pnp in detector 1.

For internal TDI processing, the charges successively summed in the cell storage sinks (not represented) are transferred, by successive addition of cell to neighbouring cell in the same row via a charge-coupled device 3 (charge-coupled device is abbreviated to CCD) integrated in the rear of detector 1, to a shift circuit 4. In circuit 4, which consists of storage zones aligned in a column, the charges summed horizontally are read vertically by successive transfer from one zone of circuit 4 to the adjacent zone.

A sequencer 5 synchronizes the scanning of the detector by system 2, the successive addition of charges from one cell to those from another via a transfer circuit and the reading by shift circuit 4 by harmonizing the scan voltages and the transfer voltages applied to CCD storage sinks and the zones in shift circuit 4. Consequently, the frequency at which charges are transferred from one cell to another is controlled by sequencer 5 so that they are added and read at the same high speed as the detector horizontal linear scan. At output from circuit 4, an amplifier 6 amplifies the video signal and then applies it to terminal S.

When the number of columns of pixels in the detector 1 is small, for example 4 in the SOFRADIR 288×4-cell strip, TDI is applied directly without requiring an additional external processing circuit.

However, for a matrix detector with a larger number of columns, the number of cells contributing to a given accumulation of charges is limited by the scan linearity and the angular movements of the line of sight since, if the number is too high, the charges summed no longer correspond exactly to the same pixe analog-digital converter (ADC) 10 which receives an analog video signal output by a conventional detector, such as detector 1, and samples this signal at digital luminance levels corresponding to the luminous fluxes received from the respective detector cells. The digital luminance values for a given frame are then written into an image memory 11 via an address generator 12 which positions these values in memory 11 as a function of the position of the cells in the image of the scene observed at the instant at which they receive the corresponding light flux. A sequencer 13 defines the address timing as a function of the scan speed so that each luminance value memorized corresponds to the flux received by each cell in detector 1 during the same predetermined time.

External TDI then involves adding the luminance values for one frame to those for the next frame, the frames being successively stored and read at the rate defined by sequencer 13 with a shift of 1 pixel, i.e. between the luminance value for a first frame received from a given cell and the luminance value received from the neighbouring cell which has output, at the next frame and due to the shift of the detector by an appropriate distance, the luminous flux received from the same point in the scene. To do this, the detector must move, between two read operations, a distance equal to that between the centers of two adjacent cells to obtain a shift of 1 pixel.

The values are added for a predetermined number of successive frames, for example 8 to 12, these summed frames also being said to be "shifted by 1 pixel". The addition is done by a loop accumulator consisting of memory 11 connected to adder 14. The output from the external TDI circuit is an analog video signal S', obtained after conversion to analog form by a digital-analog converter (DAC) 16.

In the case of the external TDI circuit described above, the scan speed therefore makes it necessary to shift the detector a distance equal to that between the centers of 2 cells, referred to earlier as a "1-pixel shift", between each read of the detector frame. For example, if the image resolution is 1 mrad per pixel and the read rate is 1 ms, the nominal scan speed is 1 rad/s.

In the invention, the chosen scan speed is not equal to, for example it is less than, the nominal value required for external TDI and thus creates new frames. The digital luminance values can then be summed, with or without a shift, using different combinations to suit the different types of scan possible: linear, circular or spiral. The number of frames to be summed and the types of successives additions, i.e. with or without shift, depends on the conditions under which the scan is made, in particular the way in which the scene observed varies, which depends on the mode in which the detector is used, and the type of scan used.

Figure 3:
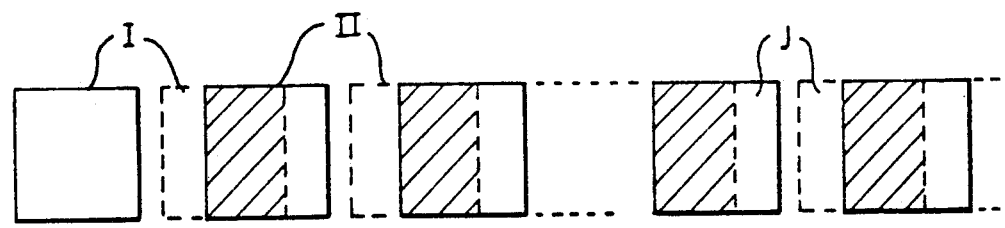
FIG. 3 illustrates a frame shift of less than 1 pixel.

When the speed is not nominal, the sum, with or without a 1-cell shift, no longer coincides with the sums with or without a 1-pixel shift used in the previous techniques. In fact, the cells that correspond to the accumulated luminance values are then those which, because the scan speed is no longer nominal, have output luminous fluxes which no longer originate from exactly the same point in the image; the values are then summed, with or without a 1-cell shift, so that the surfaces covered by the corresponding cells overlap, at least partially, the surface of a given pixel. FIG. 3 shows such partial overlapping of cells in one row of a photosensitive matrix with a frame shift of less than 1 pixel. Cells I, II ..., N, represented by the solid-line boxes, are those for the first frame while the same cells are represented in dotted lines for the next frame, shifted by less than 1 pixel. The overlapping areas are crosshatched.

Consequently, a scan speed of a fraction 1/k of the nominal speed defined previously will create k-1 intermediate frames between 2 primary frames shifted by 1 pixel, the second of these primary frames becoming the $k+1^{th}$ frame. It is possible to calculate k-1 additional sums of the luminance values, with no pixel shift, for a certain number of the first intermediate frames read in succession and then, with the same unit shift relative to the first frame, for the remainder of the intermediate frames.

The sums obtained with a shift correspond to the frame sums produced in external TDI processing with scanned detectors while the sums with no shift are similar to the frame sums obtained with post-integration processing, conventionally applied to unscanned detectors or retinas.

The number and type of successive additions, with or without shift, must still be determined but the possibility of varying the number and choosing the frequency of the additions with or without shift allows flexibility in adapting to the conditions and type of scan which could not be obtained either with the TDI technique or the post-integration technique, whether used separately or sequentially.

It is therefore possible to systematically increase the number of values summed, with and without shift, i.e. using all frames, even those which are not shifted by exactly 1 pixel. This increase is equivalent to an increase in the number of pixels contributing to each of the accumulated values. Consequently, the sensitivity of the signal generated, which is proportional to the square root of the number of pixels involved, is increased.

Returning to the numerical example used to illustrate the external TDI circuit, a scan speed of 0.5 rad/s, which gives a 1-pixel shift every 2 frames, creates only one intermediate frame. Because the number of values summed is doubled, the signal sensitivity is multiplied by $\sqrt{2}$. The summing of the values memorized in succession can then comply with the following addition scheme:

addition of frames 1 and 2 with a 1-pixel shift;
addition, with no shift, of the frame 3 pixels;
addition, with a 1-pixel shift, of frame 4;
addition, with no shift, of frame 5, etc.

Such an adding scheme can, for convenience, be represented by 1010101 ..., where 0 represents an addition with no pixel shift and 1 an addition with a pixel shift.

For structural reasons, due to the size of the optomechanical scanning system, it is occasionally difficult to implement linear scanning. For example, if the homing head is stabilized in elevation and roll, a circular or spiral scan of the image is preferable. These types of scan are well-known to industry and will not be described in this invention. We shall simply point out that it requires an optical derotator or electronic processing to erect the image parallel to the detector rows.

Figure 4:
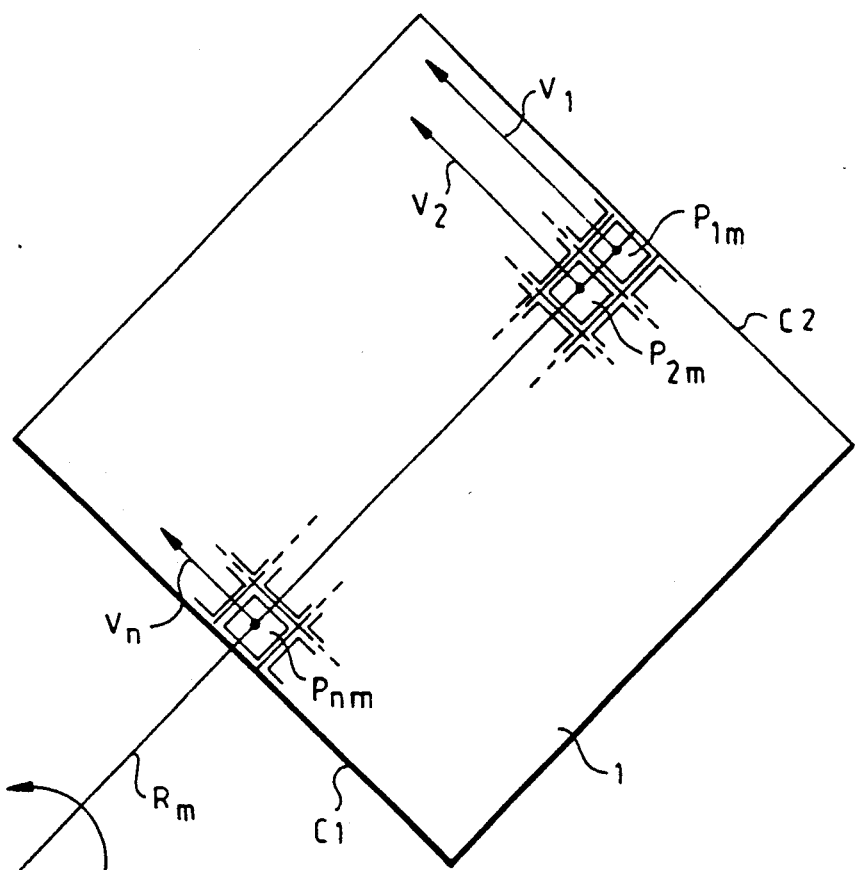
FIG. 4 illustrates an embodiment of an infrared detector in the circular scan mode.

For circular or spiral scan, as shown in FIG. 4, the detector 1 is rotated about axis A. A mobile median radius $R_m$ is defined as starting from the origin of axis A in the figure plane and passing through the center of the opposite sides C1 and C2 of detector 1, so that there are the same number of pixels on the left of radius $R_m$ as on the right. For example, radius $R_m$ splits a 32×32-pixel matrix detector into two identical 16×32-pixel half-detectors. The length of radius $R_m$ is constant for a circular scan and varies periodically for a spiral scan.

FIG. 4 also shows the linear velocity vectors V1, V2, ..., Vn for the median cells $P_{1m}$, $P_{2m}$, ..., $P_{nm}$ in rows 1, 2, ..., n of detector 1. The linear scan velocity varies in proportion to the distance from axis A. If, for example, distance AP1m is equal to or double the distance APnm, and if the detector movement is one pixel per frame read on the first row, i.e. at P1m, the detector movement is then ½ pixel per frame read at the nth line of the detector, i.e. at Pnm. The adding scheme required under these conditions is:

1111111 ..., for the first row
1010101 ..., for the nth and last row.

The adding scheme depends on the row of pixels considered. It can, therefore, be represented by a matrix-type structure and no longer by a single line as in the case of a linear scan.

For intermediate rows, between the first and last row, intermediate adding schemes can be used, regularly introducing, from one row to the next, an increasing number of additions with no shift up to 50% of the number of additions for the last row.

For example, the following intermediate addition rows could be suitable:

...

1111011110...

...

111011101110.

...

110110110110

...

The detector complying with the invention includes means of adding, with or without a pixel shift, the frame luminance values read in succession and means of selecting, in time, the types of addition applied, that is with or without a pixel shift, and the frequency at which they are applied to match the scan characteristics output by the detector scan system.

Figure 5:
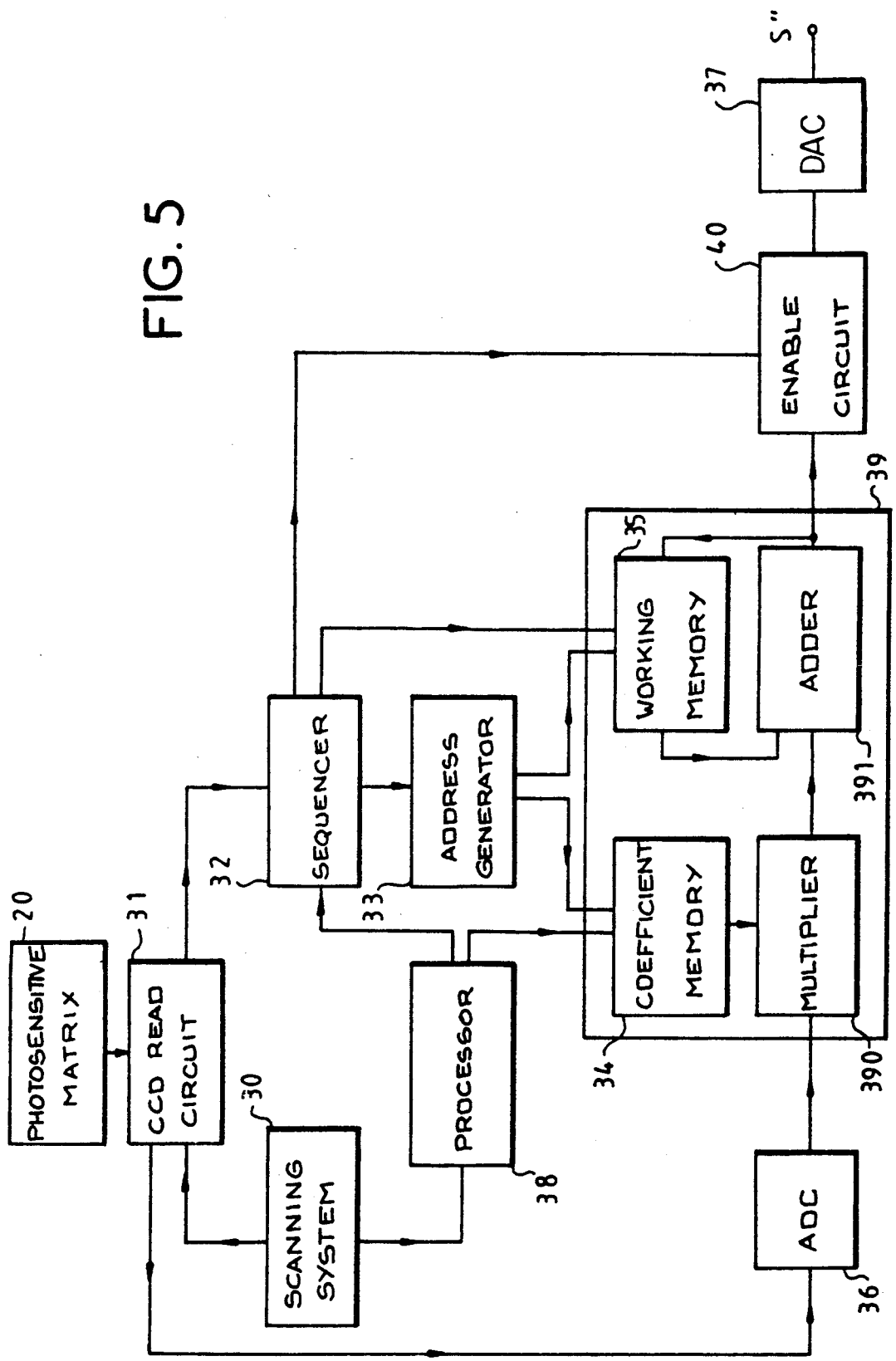
FIG. 5 illustrates the electronic circuit in a camera using a detector complying with the invention.

FIG. 5 shows an example of an embodiment of the electronic circuit for an infrared camera using a detector complying with the invention.

This circuit includes a main useful-signal transmission channel connecting one of the two outputs from a CCD read circuit 31, connected to a matrix of photosensitive cells 20, to the input of an integrator 39 via an analog-digital converter (ADC) 36; integrator 39 outputs a digital signal, possibly enabled by an enable circuit 40, that is then converted in a digital-analog converter 37, which outputs a video signal "S".

Read circuit 31 is connected to one output of the scanning system 30 control circuit. In addition, a data input to a processor 38 is connected to a data output from the scanning system 30. Processor 38 has two outputs, one connected to an input to sequencer 32 and the other to an integrator 39 control input.

A synchronization output from CCD read circuit 31 is connected to a second input to sequencer 32 whose first output is connected to a second integrator 39 control input and whose second output is connected to an enable circuit 40 control input.

Integrator 39 includes a multiplier 390 and an adder 391 connected between its signal input, itself connected to the output of converter 36, and its signal output. It also includes two memories, a coefficient memory 34 and a working memory 35, whose outputs are connected respectively to a second input to multiplier 390 and a second input to adder 391. Adder 391 is connected as an accumulator by a loop which connects its output to a memory 35 data input.

An address generator 33, controlled by sequencer 32, is connected to the address inputs to memories 34 and 35.

The output from the camera scanning circuit 30 is connected to the processor 38 data input to constantly provide data on the scan characteristics:
- the value of the median scan radius Rm and the rotation speed if a circular or spiral scan is used,
- the linear scan speed if a linear series-parallel scan is used.

Processor 38 uses this data to calculate, firstly, the number of additions required for the scan conditions, this number being output to sequencer 32 and, secondly, selects an addition scheme, consisting of the most suitable 0 and 1 coefficients for this data, from various sets of coefficients stored in memory 34, these sets corresponding to various predetermined values of the data. The main output from the camera scanning system 30 controls read circuit 31 connected to the matrix 20. Circuit 31 then feeds synchronization pulses to sequencer 32, one of whose outputs controls address generator 33 connected to the address inputs to memories 34 and 35 so that these memories are synchronously read or written.

Read circuit 31 inputs an analog signal to ADC 36 which converts the signal into a series of digital-coded values expressed, for example, in 12 bits. In integrator 39, these digital values are multipled, by multiplier 390, by the values of the coefficients (0 or 1) in the adding schemes processor 38 has selected in memory 34, each coefficient value being addressed by address generator 33; the products formed are then accumulated in working memory 35 by feeding these products to the accumulator consisting of memory 35 and adder 391. The accumulator sums the products, output successively by multipler 390, a certain number of times corresponding to the number of additions selected by processor 38, under the control of sequencer 32 via memory 35. After enablement and conversion by DAC 37, the cumulative values form an analog video output signal S". Enablement is controlled by sequencer 32 and triggered by applying a signal to enable circuit 40 placed upstream of converter 37 so that the number of additions selected remains compatible with the data output by the scan system 30 and processed by processor 38.

In addition to being used in the scan mode, the detector complying with the invention can also be used when the camera is operated in a non-scan mode, for example when tracking an identified target. In this phase, the camera line of sight is controlled to follow the target and the scan can be stopped so that the detector is in an optimum position on the image of the screen observed, corresponding to the position of the target. The increased insensitivity is then preferably obtained by accumulating the luminance values from the same cells with no shift. This can be done simply by selecting the number of frames to be added and choosing an addition scheme with no pixel shifts for the successive frames to be accumulated, i.e. schemes comprising only 0. In this case, the technique invented becomes equivalent to conventional post-integration.

What is claimed is:

1. A high-sensitivity infrared detector system having a matrix of individual photosensitive cells (P11, ... Pnp) means of forming a video signal following multiplexing, by a CCD read circuit, of luminance signals output in succession by the cells, proportional to luminous flux individually received from pixels in an image of the scene observed and received by each corresponding cell during a periodic scan of the image of the scene controlled by a scanning system, and a circuit to convert the video signal into digital luminance values corresponding to the signals output by the photosensitive cells, the detector system comprising:

an accumulation circuit to accumulate, during reads of successive frames, luminance values output by adding a luminance value output of each detector cell when reading a frame either to the luminance value output, without any shift by a given cell or, to the luminance value output, after a shaft, by an adjacent cell partially covering the same pixel when the next frame is read;

and selection circuits including a processor, to select in accordance with data relating to the characteristics of the detector scan and delivered by the scanning system to the selection circuits, sequences of binary values corresponding to the type of successive additions to be done, either with or without a cell shift, to apply in time each binary value of such sequences to each corresponding luminance value of each frame read, in order to address in the accumulation circuit such luminance values, whether or not shifted.

2. A detector as described in claim 1 in which the accumulation circuit that adds, with or without a pixel shift, the luminance values output, after conversion by an analog-digital converter, by the photosensitive cells (P 11, ... Pnp) includes an integrator including a multiplier connected to a coefficient memory which stores several sets of coefficients, each coefficient having one of two values, each value indicating one of the two types of addition, and an accumulator consisting of a working memory and an adder coupled to the output of the multiplier and in which the selection circuits include a processor connected to the coefficient memory and a sequencer, itself connected to memories via an address generator.

3. A detector as described in claim 2 in which, in a tracking mode, the detector scan is stopped with a detector in an optimum position on the image of the scene observed, the corresponding set of coefficients then consisting entirely of 0 so that the luminance values are added without any shift.

4. An infrared detector as described in claim 2, in which the scanning system is connected to the read circuit, the scanning system including a scan data output connected to the processor to allow selection, in the coefficient memory, of one of the several sets and sequence of adding coefficients corresponding to the scanning data from the several sets of coefficients, the output from the integrator being connected to a digital-analog converter via an enable circuit to output the data supplied by the integrator at the completion of each sequence and restores an analog vide output signal.

5. A detector as described in claim 4, in which the scanning system applies a linear series-parallel scan of the matrix, the sets of coefficients stored in the coefficient memory consisting of series of coefficients 0 and 1 where 0 indicates addition of the luminance values without a pixel shift and 1 an addition of the luminance values with a pixel shift.

6. A detector as described in claim 4 in which the scanning system applies a non-linear scan of the matrix, the sets of coefficients in the coefficient memory consisting of matrices of coefficient 0 and 1 where 0 indicates an addition of the luminance values without a pixel shift and 1 addition of the values with a pixel shift, each row in the matrix corresponding to a row of pixels.

* * * * *